(12) United States Patent
Meuret et al.

(10) Patent No.: US 11,028,966 B2
(45) Date of Patent: *Jun. 8, 2021

(54) METROLOGY GRADE LIGHT WEIGHT TRIPOD

(71) Applicant: BRUNSON INSTRUMENT COMPANY, Kansas City, MO (US)

(72) Inventors: Mark J. Meuret, Overland Park, KS (US); Eric L. McKinney, Grain Valley, MO (US)

(73) Assignee: BRUNSON INSTRUMENT COMPANY, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,509

(22) Filed: Jun. 24, 2019

(65) Prior Publication Data

US 2019/0309896 A1 Oct. 10, 2019

Related U.S. Application Data

(63) Continuation of application No. 12/732,120, filed on Mar. 25, 2010, now Pat. No. 10,330,245.

(60) Provisional application No. 61/163,434, filed on Mar. 25, 2009.

(51) Int. Cl.
*F16M 11/34* (2006.01)
*F16M 11/16* (2006.01)

(52) U.S. Cl.
CPC ............. *F16M 11/34* (2013.01); *F16M 11/16* (2013.01); *F16M 2200/027* (2013.01); *F16M 2200/068* (2013.01)

(58) Field of Classification Search
CPC ....... F16M 2200/068; F16M 2200/027; F16M 11/16; F16M 11/34; F16M 11/36; F16M 11/28; F16M 11/32; F16M 11/126
USPC ............ 248/163.1, 431, 166, 435, 168, 169, 248/176.1, 188.5, 481, 177.1, 188.7, 248/188.6
See application file for complete search history.

(56) References Cited

U.S. PATENT DOCUMENTS

| 413,118 A | 10/1889 | Warner |
| 768,154 A | 8/1904 | Selden |
| 821,052 A | 5/1906 | McLeod |
| 2,059,996 A | 11/1936 | Nathan |

(Continued)

FOREIGN PATENT DOCUMENTS

WO 2010/111544 A1 9/2010

OTHER PUBLICATIONS

"Final Office Action received for U.S. Appl. No. 12/732,120 dated Apr. 22, 2013, 14 pages.", 14 pages.

(Continued)

*Primary Examiner* — Muhammad Ijaz
(74) *Attorney, Agent, or Firm* — Kutak Rock LLP (57) ABSTRACT

A tripod and a method of stabilizing a collapsible stand are provided. The tripod includes three legs attached to a base that swing open to a predetermined angle against a positive stop. The legs are locked into place in the open position via a leg spreader that forces (or pre-stresses/pre-loads) the legs outward against the stops. The method includes the steps of pivoting the legs of the collapsible stand to an open pivotal position into engagement with a stop, applying a load upon the legs to force the legs against the stop, and maintaining the load upon the legs while the stand is in use.

20 Claims, 6 Drawing Sheets

(56) References Cited

U.S. PATENT DOCUMENTS

| | | | | |
|---|---|---|---|---|
| 2,143,606 | A | * | 1/1939 | Mooney .................. F16M 11/16 248/183.2 |
| 2,282,285 | A | | 5/1942 | Olson |
| 2,303,978 | A | | 12/1942 | Biberman |
| 2,550,415 | A | | 4/1951 | Charles |
| 2,550,550 | A | | 4/1951 | Goodstein |
| 2,612,139 | A | | 9/1952 | Joseph |
| 2,633,319 | A | | 3/1953 | Musial |
| 2,802,635 | A | | 8/1957 | Engelbart |
| 2,919,093 | A | | 12/1959 | Raymond |
| 4,121,893 | A | | 10/1978 | Morissette |
| 4,317,552 | A | * | 3/1982 | Weidler .................. F16M 11/16 211/203 |
| 4,557,335 | A | | 12/1985 | Handy |
| 4,596,484 | A | | 6/1986 | Nakatani |
| 4,832,296 | A | | 5/1989 | Schnepp |
| 5,098,182 | A | | 3/1992 | Brown |
| 5,494,333 | A | | 2/1996 | Wilson |
| 5,503,357 | A | | 4/1996 | Johnson |
| 5,865,406 | A | | 2/1999 | Teeple |
| 5,934,628 | A | | 8/1999 | Bosnakovic |
| 6,322,027 | B1 | * | 11/2001 | Hsu ........................ F16M 11/34 248/177.1 |
| 6,702,641 | B2 | | 3/2004 | Oakley |
| 6,820,844 | B2 | | 11/2004 | Tiffen et al. |
| 7,294,094 | B1 | | 11/2007 | Howle |
| 7,513,470 | B2 | * | 4/2009 | Lomberk ................ F16M 11/32 108/106 |
| 7,621,491 | B2 | | 11/2009 | Law |
| 7,753,330 | B2 | | 7/2010 | Brief |
| 8,047,481 | B2 | * | 11/2011 | Shen ...................... F16M 11/36 248/178.1 |
| 8,047,498 | B1 | * | 11/2011 | Karty ..................... F16M 11/36 248/545 |
| 8,141,827 | B2 | * | 3/2012 | Lin ........................ F16M 11/242 248/171 |
| 10,330,245 | B2 | | 6/2019 | Meuret et al. |
| 2003/0150966 | A1 | | 8/2003 | Lindsay |
| 2003/0234327 | A1 | | 12/2003 | Nakatani |
| 2004/0155159 | A1 | | 8/2004 | Tiffen et al. |
| 2005/0056739 | A1 | * | 3/2005 | Koning ................ F16M 11/046 248/171 |
| 2005/0121590 | A1 | * | 6/2005 | Vanover ................. F16M 11/16 248/519 |
| 2006/0086869 | A1 | * | 4/2006 | Hsieh .................... F16M 11/046 248/171 |
| 2007/0075209 | A1 | * | 4/2007 | Kapp .................... F16M 11/046 248/460 |
| 2007/0090235 | A1 | | 4/2007 | Ziemkowski et al. |
| 2007/0090237 | A1 | | 4/2007 | Hsu |
| 2007/0235605 | A1 | * | 10/2007 | Voelz ..................... G10D 13/00 248/188.8 |
| 2009/0072100 | A1 | * | 3/2009 | Zierer .................... F16M 11/34 248/169 |
| 2009/0250567 | A1 | * | 10/2009 | Raynaud ............... F16M 11/16 248/168 |
| 2010/0064739 | A1 | * | 3/2010 | Lu ......................... F16M 11/34 70/57 |
| 2010/0108832 | A1 | * | 5/2010 | Zen ....................... F16M 11/32 248/177.1 |
| 2011/0073722 | A1 | * | 3/2011 | Meuret .................. F16M 11/16 248/169 |
| 2012/0067752 | A1 | * | 3/2012 | Bohurjak ............... F16M 11/34 206/320 |
| 2019/0032841 | A1 | * | 1/2019 | Becker .................. F16M 11/36 |

OTHER PUBLICATIONS

"Final Office Action received for U.S. Appl. No. 12/732,120 dated Jul. 30, 2014, 15 pages."

"Final Office Action received for U.S. Appl. No. 12/732,120 dated Mar. 22, 2016, 25 pages."

"International Preliminary Report received for International Application No. PCT/US2010/028740 dated Oct. 6, 2011, 7 pages.", 7 pages.

"Non-Final Office Action received for U.S. Appl. No. 12/732,120 dated Jun. 1, 2012, 13 pages.", 13 pages.

"Non-Final Office Action received for U.S. Appl. No. 12/732,120 dated Feb. 12, 2014, 18 pages.", 18 pages.

"Non-Final Office Action received for U.S. Appl. No. 12/732,120 dated Jun. 26, 2015, 17 pages.", 17 pages.

"Notice of Allowance Received for U.S. Appl. No. 12/732,120, dated Feb. 21, 2019, 10 pages".

"Written Opinion of International Search Authority in PCT/US2010/028740 dated May 20, 2010", Sep. 30, 2010.

Instruction Manual LXD 75-Series Telescopes (68 pages); published Feb. 2005.

Update Changes to the Meade LXD-75 manual (1 page); published Sep. 2004.

Vock, Curtis; Letter Regarding U.S. Pat. No. 10,30,245; Apr. 29, 2021.

* cited by examiner

METROLOGY GRADE LIGHT WEIGHT TRIPOD

CROSS-REFERENCE TO RELATED APPLICATIONS

This application is a continuation application of U.S. patent application Ser. No. 12/732,120, filed Mar. 25, 2010, now U.S. Pat. No. 10,330,245, which claims priority pursuant to 35 U.S.C. 119(e) to U.S. Provisional Patent Application Ser. No. 61/163,434, filed Mar. 25, 2009, the entire disclosures of which are incorporated herein by reference.

FIELD OF THE INVENTION

The present invention relates to a stand for various pieces of measuring equipment. More particularly, the present invention relates to a light-weight, rigid tripod for measuring equipment and to a method of stabilizing a stand (such as a tripod) for measuring equipment.

BACKGROUND OF THE INVENTION

Various industries require precise and accurate measuring for a number of applications, such as production, manufacturing and process control. In many such applications measurement errors on the order of even one thousandth of an inch can be critical. Thus, it is important that the measuring equipment being used be stably supported. To provide such stable support, a stand or tripod is often used. Such stands or tripods are typically rather bulky and heavy to provide the rigidity necessary to support the measuring equipment. Therefore, it would be beneficial to provide a stand for measuring equipment that is light weight and/or less bulky than conventional stands.

SUMMARY OF THE INVENTION

An object of the instant invention is to provide an improved stand for measuring equipment. Another object of the instant invention is to provide a stand for measuring equipment that is light weight. Still another object of the instant invention is to provide a stand for measuring equipment that is collapsible. Yet another object of the instant invention is to provide a stand for measuring equipment that is less bulky than conventional stands. Still another object of the instant invention is to provide a method for stabilizing a collapsible stand for measuring equipment during use.

The above objects of the instant invention are accomplished through the use of a collapsible tripod that includes three legs attached to a base that swing open to a predetermined angle against a positive stop. The legs are locked into place in the open position via a leg spreader that forces (or pre-stresses/pre-loads) the legs outward against the stops.

In one embodiment, the leg spreader comprises a member that is adjustably mounted to the base. In another embodiment, the leg spreader comprises leg-to-leg cross braces that are adjustably mounted between each of the legs of the tripod. In still another embodiment, the leg spreader comprises both a member that is adjustably mounted to the base and leg-to-log cross braces that are adjustably mounted between each of the legs of the tripod.

In other embodiments of the instant invention, optional accessories may be installed on or included with the tripod. Exemplary accessories include, but are not limited to, padded feet for each leg, pointed feet for each leg, wheels for each leg, combination wheels and pads/points for each leg (in which the pad/point extends upward and downward from the bottom of the leg to either utilize the wheel when the pad/point is up or the pad/point when the pad/point is down), laptop shelf attached to the base, or levels, and carrying cases. Embodiments of the instant invention further include a standard thread mount on the top of the base for mounting measurement instruments and other adapters.

In other preferred embodiments, the legs of the tripod of the instant invention are extendible and retractable to allow for height adjustment. In some such embodiments, the legs are locked into a desired height position utilizing a cam style lever locking mechanism. In still further such embodiments, index marks are included on the legs to provide visual guides when adjusting leg heights.

In use, the tripod/stand of the instant invention is stored in a collapsed arrangement in which the legs of the stand are pivoted in toward the center of the stand and are generally parallel to one another. The method of use of the stand includes the steps of pivoting the legs of the collapsible stand to an open pivotal position into engagement with a stop, applying a load upon the legs to force the legs against the stop, and maintaining the load upon the legs while the stand is in use. The primary intended use of the tripod/stand of the instant invention is with equipment that requires metrology level stability and strength. The tripod/stand of the instant invention provides the required stability and strength while also being light weight and portable. In a preferred embodiment, the tripod/stand of the instant invention can be adjusted to rigidly hold a device at heights between 29-47 inches off the ground, and is easily adjusted for that height range. Nevertheless, it will be appreciated that alternative embodiments of the instant invention include a fixed height, as well as a varying degree of alternative adjustable height ranges.

The stand of the instant invention is superior to other stands (comparable in price and weight) on the market because of its ability to become an extremely rigid and strong structure, but still remain light weight.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION OF A PREFERRED EMBODIMENT

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIGS. 1-8 various view of a tripod of an embodiment of the instant invention is shown. Tripod 10 includes top plate (base) 20 and legs 30, 32 and 34 pivotally connected to base 20. Legs 30, 32 and 34 open to a predetermined open pivotal position (angle) by creating a positive stop between each leg and the top plate 20 of the tripod 10. As is shown, each leg pivots outward from a generally collapsed position in which all three legs are stored toward the center of tripod 10 generally parallel to one another, to a fixed position in which a member 21 protruding from the top of the leg abuts a protruding portion 23 of the top plate 20.

Figure 7:
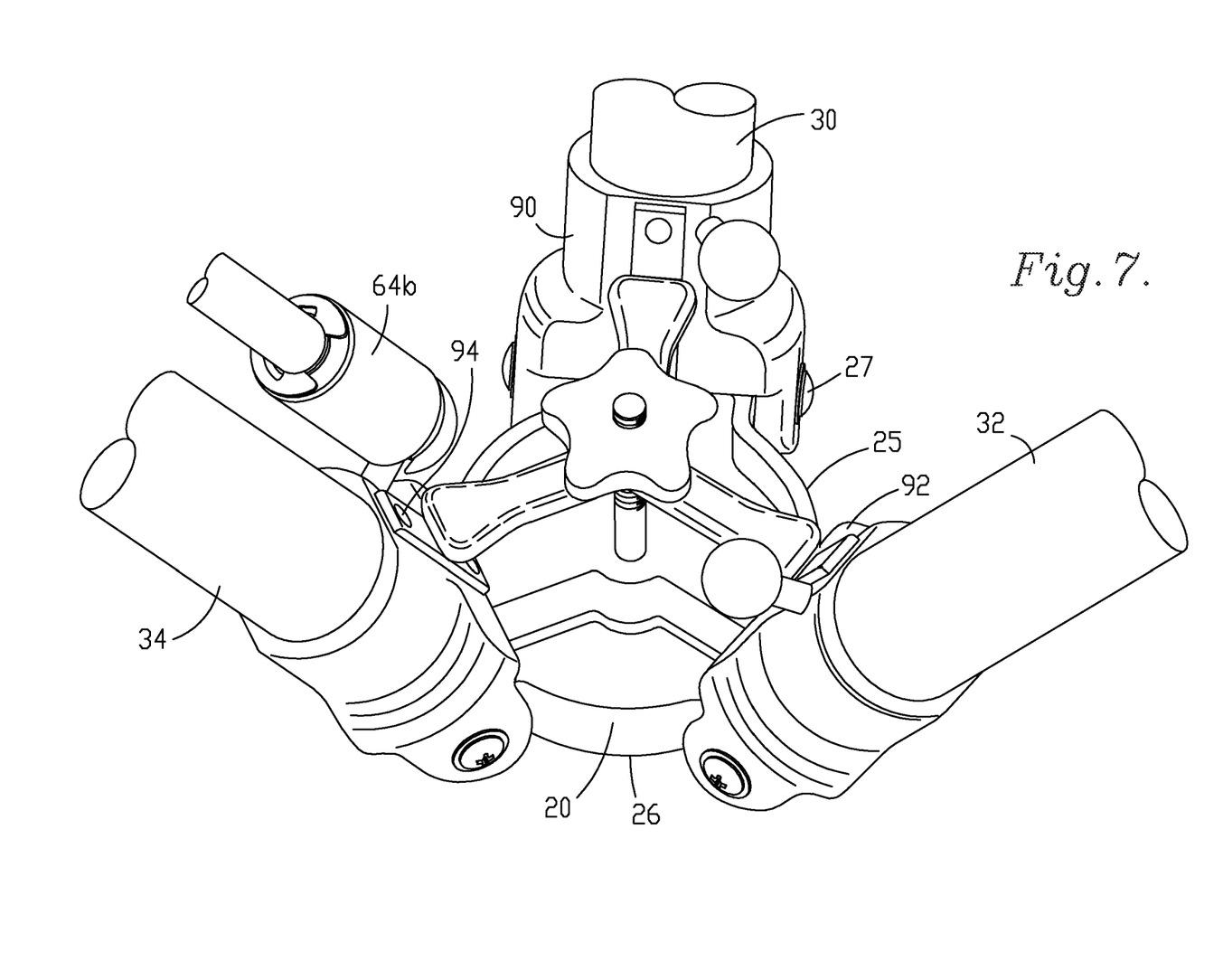
FIG. 7 is a partially enlarged bottom view of the tripod of FIG. 2.

In combination with the positive stop described above, there is a "leg spreader" device (member) 25 underneath the top plate 20 that is tightened into place once the legs are opened. This adds a slight preload to the legs to keep them tight against the positive stop. The tightened spreader member also helps remove any potential play in the top joints of the leg due to manufacturing tolerances. As is shown in FIG. 7, spreader 25 includes a generally triangular shaped (three pronged) trivet member that connects to the bottom of the top plate 20 via a threaded member 26 that extends down from the top plate 20 and through a hole in the center of the spreader member 25. A knob 27 threads onto the threaded member 26 to hold the spreader member 25 in position and to raise and lower the spreader member 25 with respect to the top plate 20. When the legs of the tripod 10 are opened, the spreader member 25 is rotated such that the dog-bone shaped (widened) ends align with an engagement plate (90, 92, 94) at the top of each leg (30, 32, 34 respectively). As the knob 27 is tightened to push the spreader member 25 up toward the top plate 20, the ends of the spreader member 25 press against the engagement plates (90, 92, 94) and force the legs (30, 32, 34 respectively) outward (open) into tight engagement of the stop discussed above. To close or fold (collapse) the legs inward, the knob 27 is loosened to lower the spreader member 25 such that the ends disengage the engagement plates, the spreader member 25 is rotated such that the ends are not aligned with the legs, and the legs are folded inward around the spreader member 25.

Bracing of the legs is from leg-to-leg creating a "tetrahedron" geometry for stiffness in the whole structure.

In the embodiment shown in FIGS. 1 through 8, the "leg spreader" further includes leg-to-leg cross bracing that cooperates with the spreader member 25 discussed above to add rigidity to tripod 10. Nevertheless, it will be appreciated that in some embodiments, spreader member 25 is used without leg-to-leg cross braces, and in other embodiments, leg-to-leg cross bracing is used without the spreader member 25. In the embodiment shown, the Leg-to-leg bracing is designed for slight interference (i.e. each brace, 40, 42 and 44, is designed to be slightly longer than the distance between each leg to create an additional outward or opening force on each leg) which causes an additional preload on the legs as they are flexed into position during the set-up of the stand.

Figure 1:
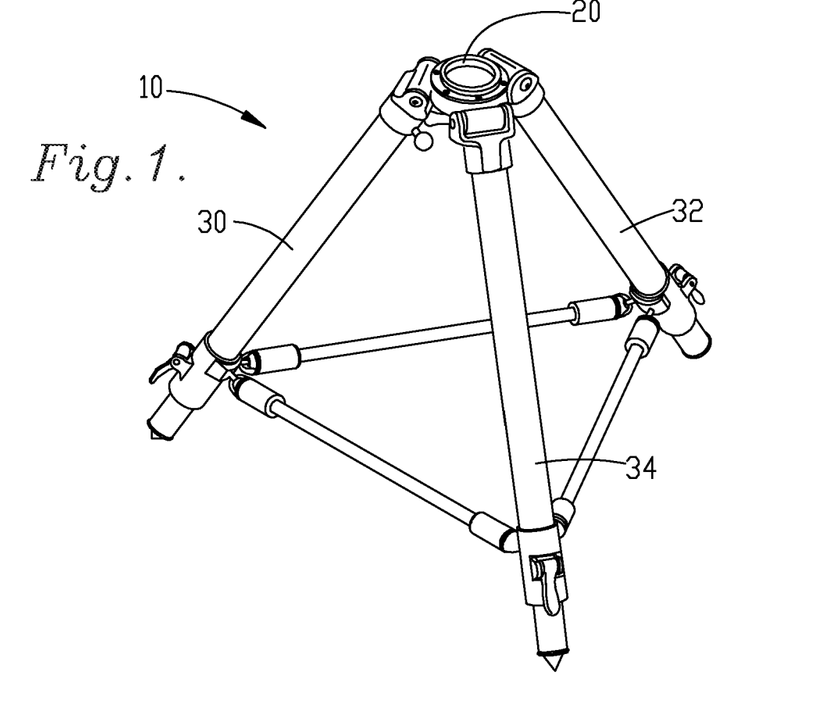
FIG. 1 is perspective view of a tripod of an embodiment of the instant invention, showing the tripod in a fully set-up position.
Figure 2:
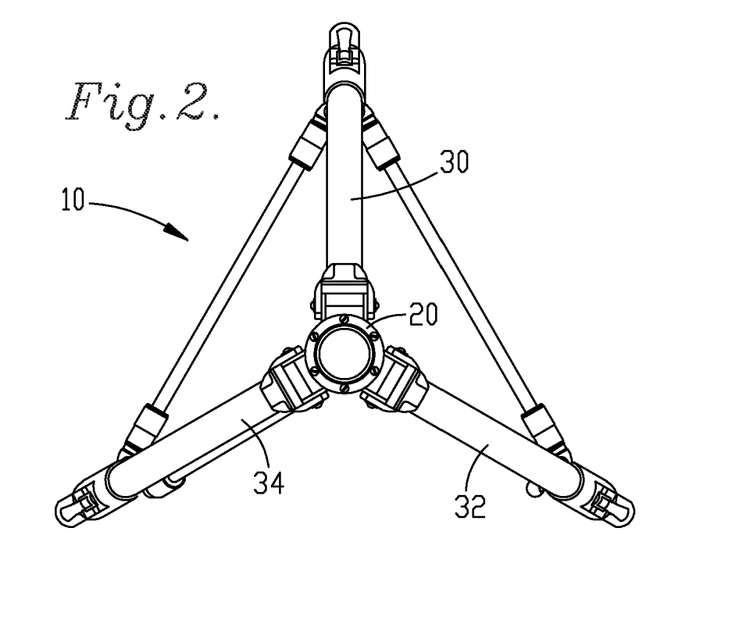
FIG. 2 is a top view of the tripod of FIG. 1, showing the tripod in a partially set-up position with one leg-to-leg cross brace in a storage position.
Figure 3:
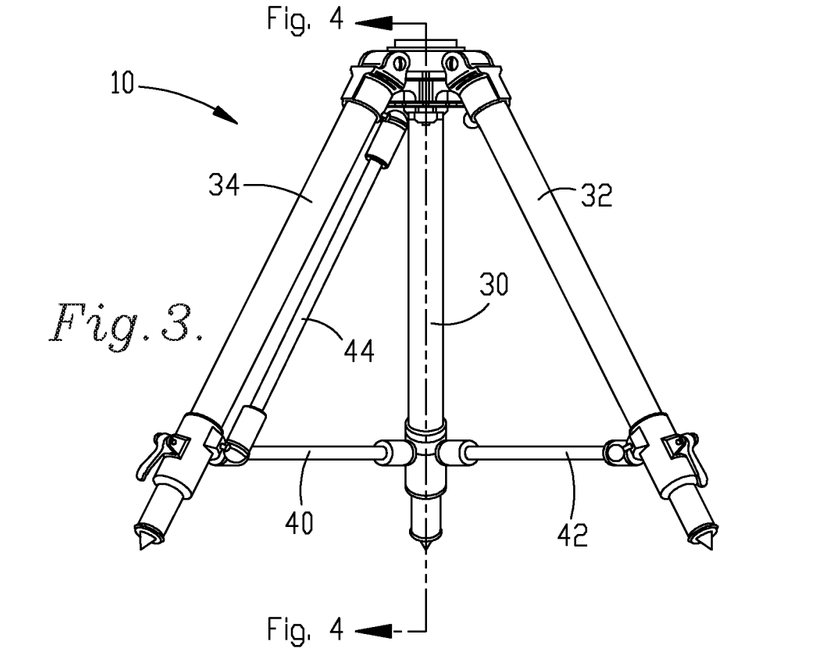
FIG. 3 is a front view of the tripod of FIG. 2.
Figure 4:
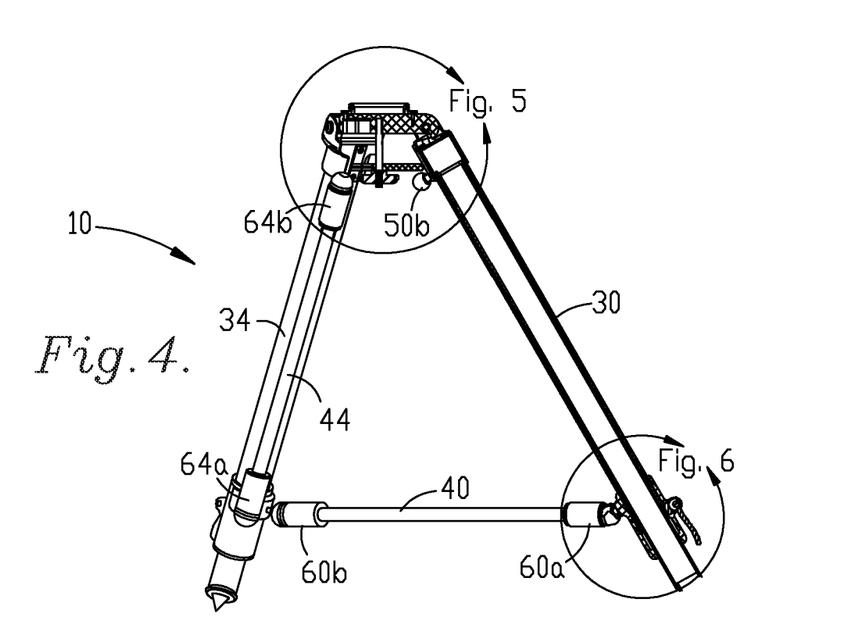
FIG. 4 is a sectional view of the tripod of FIG. 2 taken along line A-A of FIG. 3.
Figure 5:
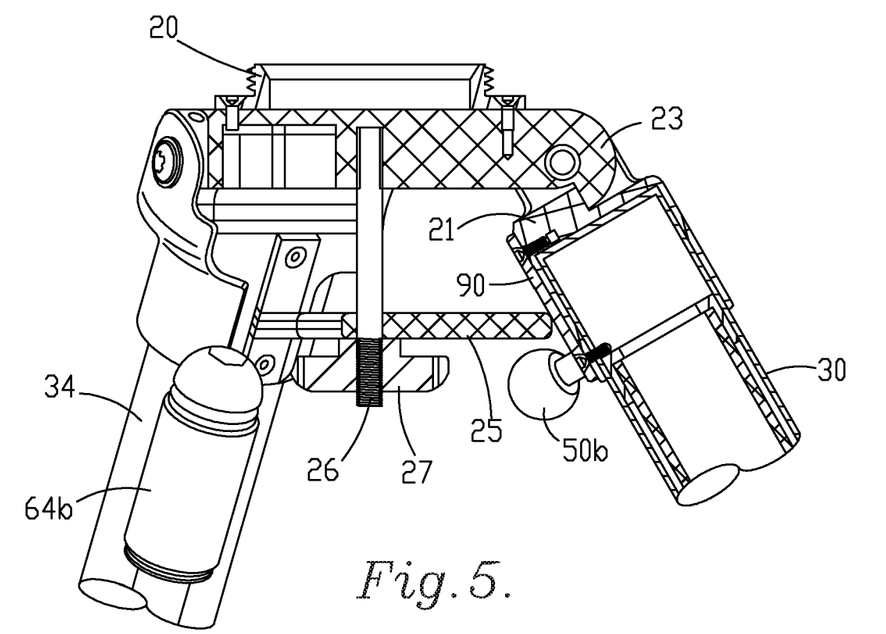
FIG. 5 is an enlarged partial sectional view of the tripod of FIG. 2 taken along line B of FIG. 4.
Figure 6:
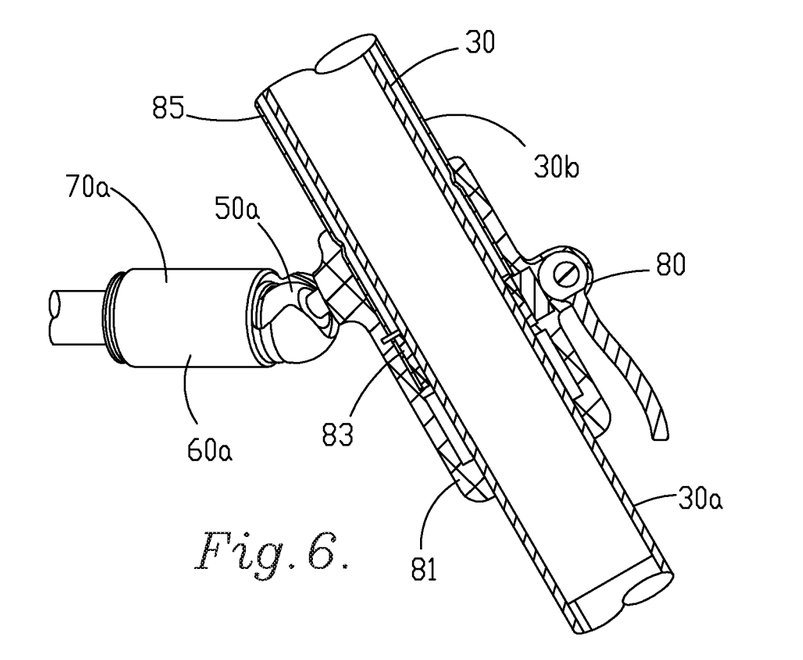
FIG. 6 is an enlarged partial sectional view of the tripod of FIG. 2 taken along line C of FIG. 4.

In the embodiment shown, the leg-to-leg cross bracing uses a ball and socket style connection where the socket (e.g. 60a and 60b) at each end of the cross brace (e.g. 40) can be tightened against the ball (e.g. 50a) located toward the bottom of each leg (e.g. 30 and 34) to form a rigid connection from leg (e.g. 30) to leg (e.g. 34). As is shown in FIG. 6, the ball and socket connection includes a coupler (e.g. 70a) that is threaded onto each end of each cross-brace (e.g. 40). The end-most portion of the cross brace includes the socket connection (e.g. 60a) for receiving the ball portion (e.g. 50a toward the bottom or 50b toward the top of each leg) of the connection that is located on each leg. The coupler (e.g. 70a) is rotated about the threads to either engage or disengage the ball socket connection. When engaged, the coupler clamps the ball (50a or 50b) into the socket (e.g. 60a) to provide a rigid point of connection. This unique ball and socket design also allows for the cross brace (40, 42, 44) to be removed from one side and folded up (pivoted) in parallel with a leg for storage when the stand is collapsed. In such cases, one end of each brace is removed from its bracing position (i.e. coupled to the ball mounted toward the bottom of each leg) and pivoted up along the leg to which it is still attached and connected to a ball mounted toward the top of the leg. For example, as is shown in FIGS. 2 through 7, cross brace 44 is folded up to be parallel with leg 34, such that socket 64b has been removed from a first ball 50a of leg 32 and attached to ball 50b of leg 34 and remains connected to a first ball 50a of leg 34. Also, as is shown in FIGS. 2 through 7, cross brace 40 connects legs 34 and 30 such that socket 60a connects to a first ball 50a of leg 30 and socket 60b connects to a second ball 50a of leg 34. Likewise, cross brace 42 connects legs 32 and 30 such that socket 62a connects a second ball 50a of leg 30 and socket 62b connects to a second ball 50a of leg 32. In the instant embodiment, balls 50a are all connected to a knee housing 86 discussed below. Nevertheless, it will be appreciated that alternative locations for balls 50a as well as balls 50b (which are connected to base 20) may be utilized without departing from the spirit and scope of the instant invention.

Figure 8:
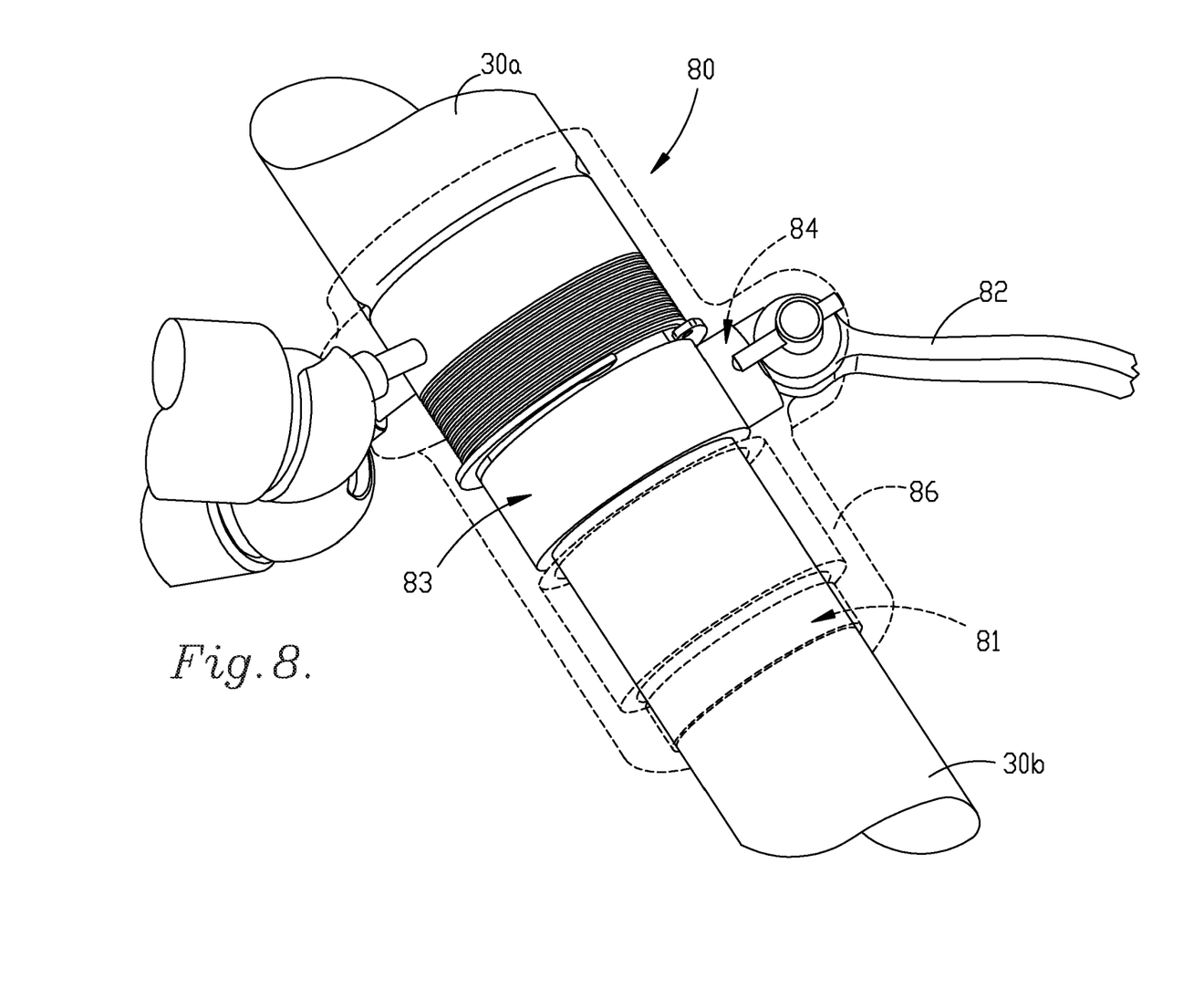
FIG. 8 is a partially transparent perspective view of the locking mechanism for the extendible legs of the tripod of FIG. 2.

Legs 30, 32 and 34 extend and retract through the ease of use of a cam lever locking mechanism 80. Each of legs 30, 32 and 34 include two pieces that slide within each other. However, when the cam is in its locked position, the two piece leg becomes rigid because of its design for three surfaces of contact within the two overlapping tubes. As is shown in FIGS. 6 and 8, the cam lever 82 is located within a "knee" housing 86 that is mounted to the lower end of the upper portion 30a of the leg assembly 30. The upper portion of the leg assembly includes a hollow inner diameter that allows the lower portion 30b of the leg assembly (which has a smaller outer diameter than the inner diameter of the upper portion) to slide in and out of the upper portion. A plastic bushing (upper bushing 85) is located toward the top end of the lower leg portion. The upper bushing is fixedly mounted to the lower leg portion such that the lower leg portion and upper bushing slide within the upper leg portion as a single unit. A middle bushing 83 and a lower bushing 81 are mounted at fixed locations (as shown in FIGS. 6 and 8) within knee housing 86 below the end (i.e. outside) of the upper leg portion. The lower leg portion slides within the middle and upper bushings. The middle bushing is located at the location of the cam and plunger assembly 84, and the lower bushing is located at the lower end of the housing 86. When the cam lever is rotated to lock the leg, the cam presses the plunger inward against the middle bushing. This inward force pushes the middle bushing against the lower leg, forcing the lower leg in the direction opposite the plunger. This in turn forces the bushing located at the top of the lower leg portion into tight frictional engagement with the inner surface of the upper leg portion at a point generally opposing the side of the leg in which the plunger is located. In addition, this forces the lower leg into tight frictional engagement with the inner surface of the lower bushing at a point generally opposing the side of the leg in which the plunger is located. This results in the three surfaces of contact discussed above.

Figure 9:
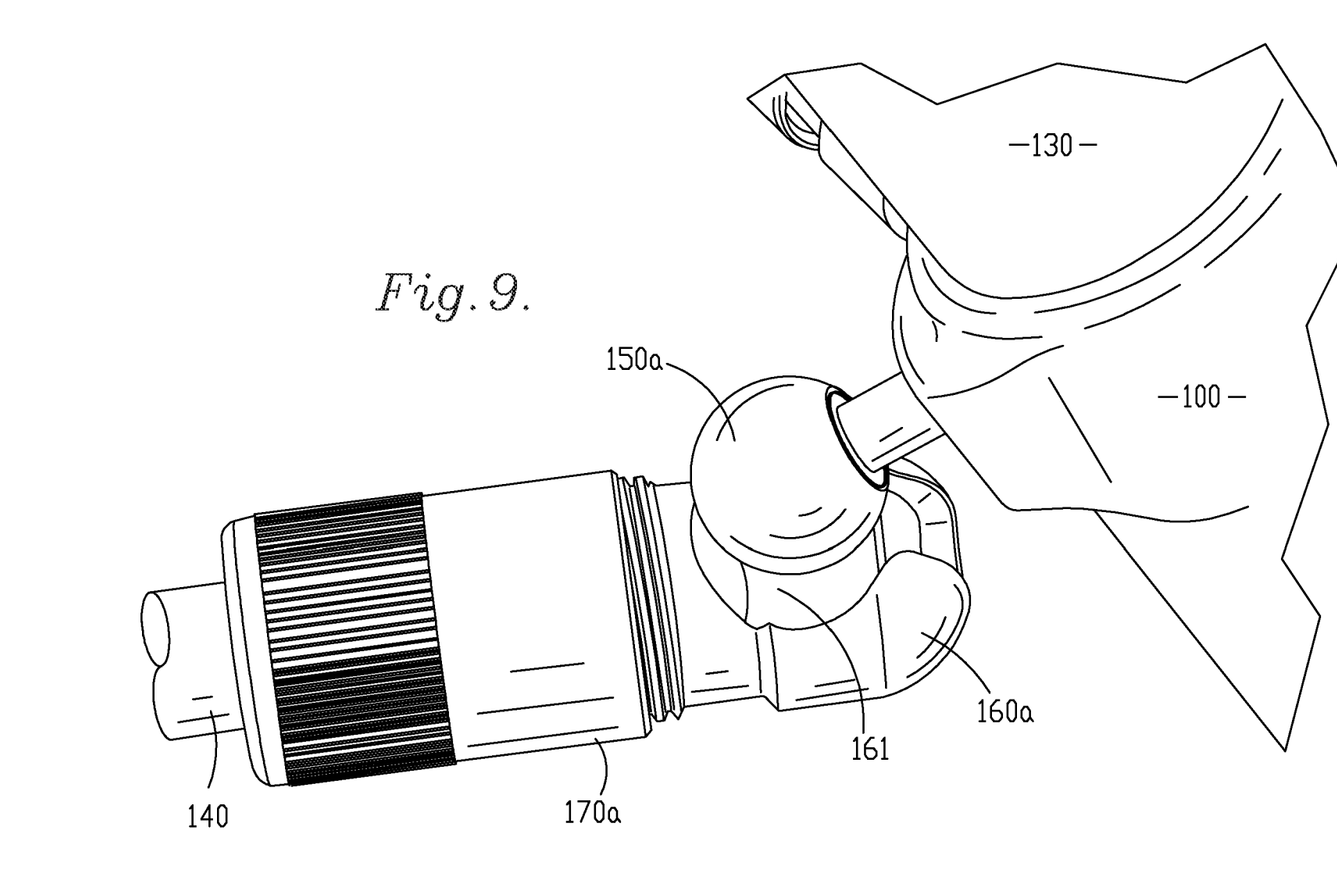
FIG. 9 is a perspective view of a ball and socket leg-to-leg cross brace connection of a second embodiment of a tripod of the instant invention.

Referring to FIG. 9, a perspective view of a ball and socket leg-to-leg cross brace connection of another alternative embodiment of a tripod of the instant invention is shown. The ball and socket connection shown in FIG. 9 includes the same basic components as is shown in FIGS. 1 through 8, including ball 150*a* that is connected to the housing of a knee 180, which in turn is attached to the upper portion 130 of a leg; socket 160*a* connected to a cross brace 140; and coupler 170*a* to clamp the ball 150*a* within socket 160*a*. In addition, the socket shown in FIG. 9 includes ramped surface 161 to aid in positioning socket 160*a* about ball 150*a* during setup of the tripod of FIG. 9.

The tripods of the embodiments discussed above provides rigid stands that are stable and light weight. Typical stands of the embodiments discussed herein weigh 20 lbs or less. Moreover, the stands of the discussed embodiments are adjustable in height from approx. 29-47 inches (with height adjustments made by extending the length of the legs). The stands of the preferred embodiments are collapsible, require minimal Set-up time (less than 3 minutes). Furthermore, the use of the cam style locking mechanisms provides for ease of use in height adjustments. The instant invention allows for movable joints to allow the stand to collapse but also enables the stand to become rigid when tripod is fully set-up. The strength and stability of the stands of the embodiments discussed herein is primarily designed to meet metrology instrument requirements. Nevertheless, it will be appreciated that alternative features to those discussed herein (i.e. height, weight, stability, etc.), may be provided without departing from the spirit and scope of the instant invention.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A tripod comprising:
a base;
a plurality of legs connected to said base;
a first stop feature associated with a first leg of said plurality of legs, said first stop feature being configured to inhibit said first leg from rotating beyond an open pivotal position; and
a leg spreader associated with said first leg, said leg spreader being configured to urge said first leg towards the open pivotal position.

2. The tripod of claim 1, wherein each of said plurality of legs is configured to selectively pivot from a respective open pivotal position to a respective collapsed position, thereby moving the tripod from a deployed configuration to a collapsed configuration, wherein said first stop feature is configured to engage with an engagement member of said first leg when the tripod is in the deployed configuration, said first stop feature being positioned outboard of said engagement member of said first leg.

3. The tripod of claim 2, wherein said first leg is generally parallel with each remaining leg of said plurality of legs when the tripod is in the collapsed configuration.

4. The tripod of claim 1, wherein urging said first leg towards the open pivotal position by said leg spreader when said first leg is already in the open pivotal position causes said first leg to be secured in the open pivotal position.

5. The tripod of claim 4, wherein said first stop feature protrudes from said base.

6. The tripod of claim 5, wherein said first leg comprises an engagement member that is configured to engage with said first stop feature when said first leg is in its open pivotal position, said engagement member of said first leg being positioned inboard of said first stop feature.

7. The tripod of claim 1, wherein said leg spreader is adjustably mounted to said base at a location central to said plurality of legs.

8. The tripod of claim 7, wherein said leg spreader is configured to translate vertically relative to said base the tripod between a collapsed configuration and a deployed configuration.

9. The tripod of claim 7, wherein said leg spreader comprises a three-pronged trivet that is rotatably mounted to said base, thereby permitting said leg spreader to move between an engaged configuration and a disengaged configuration.

10. The tripod of claim 9, wherein each prong of said trivet is associated with one of said plurality of legs such that moving the leg spreader between the engaged and disengaged configurations comprises rotating the trivet until each prong is aligned or misaligned, respectively, with a respective leg of said plurality of legs.

11. The tripod of claim 1, wherein the tripod is moveable between a collapsed configuration and a deployed configuration, each leg being in a respective open pivotal position when the tripod is in the deployed configuration.

12. The tripod of claim 11, further comprising a plurality of stop features and a plurality of braces, each brace extending between two legs such that said plurality of braces apply a load upon said plurality of legs to force each leg of said plurality of legs against a respective stop feature of said plurality of stop features, thereby generating a preload in each of said legs, wherein said plurality of stop features comprises said first stop feature, and wherein each stop feature of said plurality of stop features is associated with a respective leg of said plurality of legs.

13. A tripod for supporting an object above a surface, the tripod comprising:
   a base;
   a plurality of legs connected to said base, each leg being configured to extend between the surface and said base when the tripod is being used to support the object above the surface;
   a first stop feature associated with a first leg of said plurality of legs, said first stop feature being configured to inhibit said first leg from rotating beyond an open pivotal position; and
   a spreader configured to urge said first leg towards an open pivotal configuration, said spreader further being configured to inhibit said first leg from rotating away from said first stop feature.

14. The tripod of claim 13, wherein said spreader comprises a member mounted to said base via an adjustable mount at a location central to said plurality of legs, said member being configured to apply a load to an upper portion of said first leg such that said first leg is urged towards said first stop feature.

15. The tripod of claim 13, wherein said spreader comprises a plurality of braces, a first brace of said plurality of braces being adjustably mounted to said first leg.

16. The tripod of claim 15, wherein each brace extends between two legs such that said plurality of braces apply a load upon said plurality of legs to force each leg of said plurality of legs against respective stop features, thereby generating a preload in each leg of said plurality of legs.

17. A method of stabilizing a stand for supporting an object above a surface, the stand including a plurality of legs connected to a base and at least a first stop feature associated with at least a first leg of the plurality of legs, said method comprising:
   providing the stop feature associated with at least first leg of the plurality of legs,
   applying a load upon the first leg such that the first stop feature provides a reactive load, thereby generating a preload in the first leg; and maintaining the load upon the first leg,
   providing a spreader associated with said at least first leg, said spreader being configured to urge said at least first leg toward an open pivotal configuration.

18. The method of claim 17, wherein the first stop feature defines a maximum outward angle for the first leg.

19. The method of claim 17, further comprising applying a load upon each of the other legs of the plurality of legs such that a preload is generated in each of said plurality of legs the same.

20. The method of claim 19, wherein one of the first stop feature and a second stop feature of the tripod defines a maximum outward angle for a second leg of the plurality of legs.

* * * * *